(12) United States Patent
Romeo

(10) Patent No.: US 8,064,899 B2
(45) Date of Patent: Nov. 22, 2011

(54) SYSTEM AND METHOD FOR MULTI-MODAL MONITORING OF A NETWORK

(75) Inventor: John Romeo, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1023 days.

(21) Appl. No.: 11/786,162

(22) Filed: Apr. 11, 2007

(65) Prior Publication Data

US 2007/0286374 A1 Dec. 13, 2007

Related U.S. Application Data

(63) Continuation of application No. 10/644,260, filed on Aug. 20, 2003, now Pat. No. 7,221,938.

(51) Int. Cl.
*H04W 24/00* (2009.01)

(52) U.S. Cl. ....... 455/423; 370/216; 370/241; 379/1.01; 379/26.01; 379/201.01; 455/424; 455/425; 709/202; 709/203; 709/244

(58) Field of Classification Search ............... 704/270.1, 704/271, 275; 340/514–516; 370/216–228, 370/241–258, 351–356; 379/1.01–35, 88.11–88.15, 379/88.17, 201.01; 455/422.1–430; 709/201–211, 709/223–230

See application file for complete search history.

(56) References Cited

U.S. PATENT DOCUMENTS

| 5,119,412 | A  | * | 6/1992 | Attallah .................. | 379/102.07 |
|---|---|---|---|---|---|
| 6,272,150 | B1 | * | 8/2001 | Hrastar et al. ................ | 370/486 |
| 6,912,581 | B2 | * | 6/2005 | Johnson et al. ............... | 709/228 |
| 6,940,820 | B2 | * | 9/2005 | Fang ............................ | 370/242 |
| 6,947,984 | B2 | * | 9/2005 | Schweitzer et al. .......... | 709/224 |
| 7,054,939 | B2 | * | 5/2006 | Koch et al. .................... | 709/227 |
| 2001/0041982 | A1 | * | 11/2001 | Kawasaki et al. ............. | 704/275 |
| 2003/0088347 | A1 | * | 5/2003 | Ames ............................. | 701/33 |
| 2003/0120502 | A1 | * | 6/2003 | Robb et al. ........................ | 705/1 |
| 2003/0225893 | A1 | * | 12/2003 | Roese et al. .................. | 709/227 |

* cited by examiner

*Primary Examiner* — Hemant Patel
(74) *Attorney, Agent, or Firm* — Toler Law Group

(57) ABSTRACT

A system and method for network monitoring are disclosed. In one embodiment, a network monitoring method includes determining that a caller can receive audible information via a first access device and graphical information via a second access device. The method also includes converting a request communicated by the caller via the first access device to a directive for a network management engine to retrieve network management information related to at least one monitored network device. The method also includes translating a first portion of the network management information to a first format for communication to the first access device and translating a second portion of the network management information to a second format for communication to the second access device.

20 Claims, 2 Drawing Sheets

US 8,064,899 B2

SYSTEM AND METHOD FOR MULTI-MODAL MONITORING OF A NETWORK

CLAIM OF PRIORITY

This application is a continuation of, and claims priority from, U.S. patent application Ser. No. 10/644,260, filed Aug. 20, 2003, now U.S. Pat. No. 7,221,938 which is hereby incorporated by reference in its entirety.

FIELD OF THE DISCLOSURE

The present disclosure relates to network management, and more particularly to a system and method for multi-modal monitoring of a network.

BACKGROUND OF THE DISCLOSURE

In the world of information technology (IT), a network is made up of a series of nodes interconnected by communication paths. Networks often interconnect with computing devices of differing types and with other networks of various sizes. An enterprise network, for example, may interconnect with several local area networks (LANs) and one or more metropolitan area networks (MANs) or wide are networks (WANs).

An enterprise with a need to interconnect its various sub-networks with a broader network may do so by connecting some of the nodes on its network with nodes of the broader network. In many cases, this intermingling of smaller network assets actually helps create the broader network.

A given network may be characterized by several factors like who can use the network, the type of traffic the network carries, the typical nature of the network's connections, and the transmission technology the network uses. For example, one network may be public and carry circuit switched voice traffic while another may be private and carry packet switched data traffic. Whatever the make-up, most networks facilitate the communication of information between at least two nodes, and as such act as communications networks.

Given the potential complexity of a network, network operators and enterprises often invest a great deal of time and money managing and maintaining their networks. They usually supervise, monitor, and maintain their networks at a network operations center (NOC). A typical NOC is a room containing visualizations of the network or networks that are being monitored. The NOC may have workstations that show graphical representations of the network and provide a detailed and near real-time status of the network. In most cases, the network operations center is the focal point for network troubleshooting, performance monitoring, third party network coordination, software maintenance and distribution, as well as router and domain name management.

BRIEF DESCRIPTION OF THE DRAWINGS

The present invention is pointed out with particularity in the appended claims. However, features are described in the following detailed description in conjunction with the accompanying drawings in which:

DETAILED DESCRIPTION OF THE DRAWINGS

Network operators and enterprises often invest a great deal of time and money managing and maintaining their networks. Network administrators frequently supervise, monitor, and maintain their networks at a NOC or network operations center. The NOC is typically a room containing visualizations of the network or networks being monitored. The NOC may have workstations that show graphical representations of the network and provide a detailed and near real-time status of the network. In most cases, the network operations center is the focal point for network troubleshooting, performance monitoring, third party network coordination, software maintenance and distribution, as well as router and domain name management.

Figure 1:
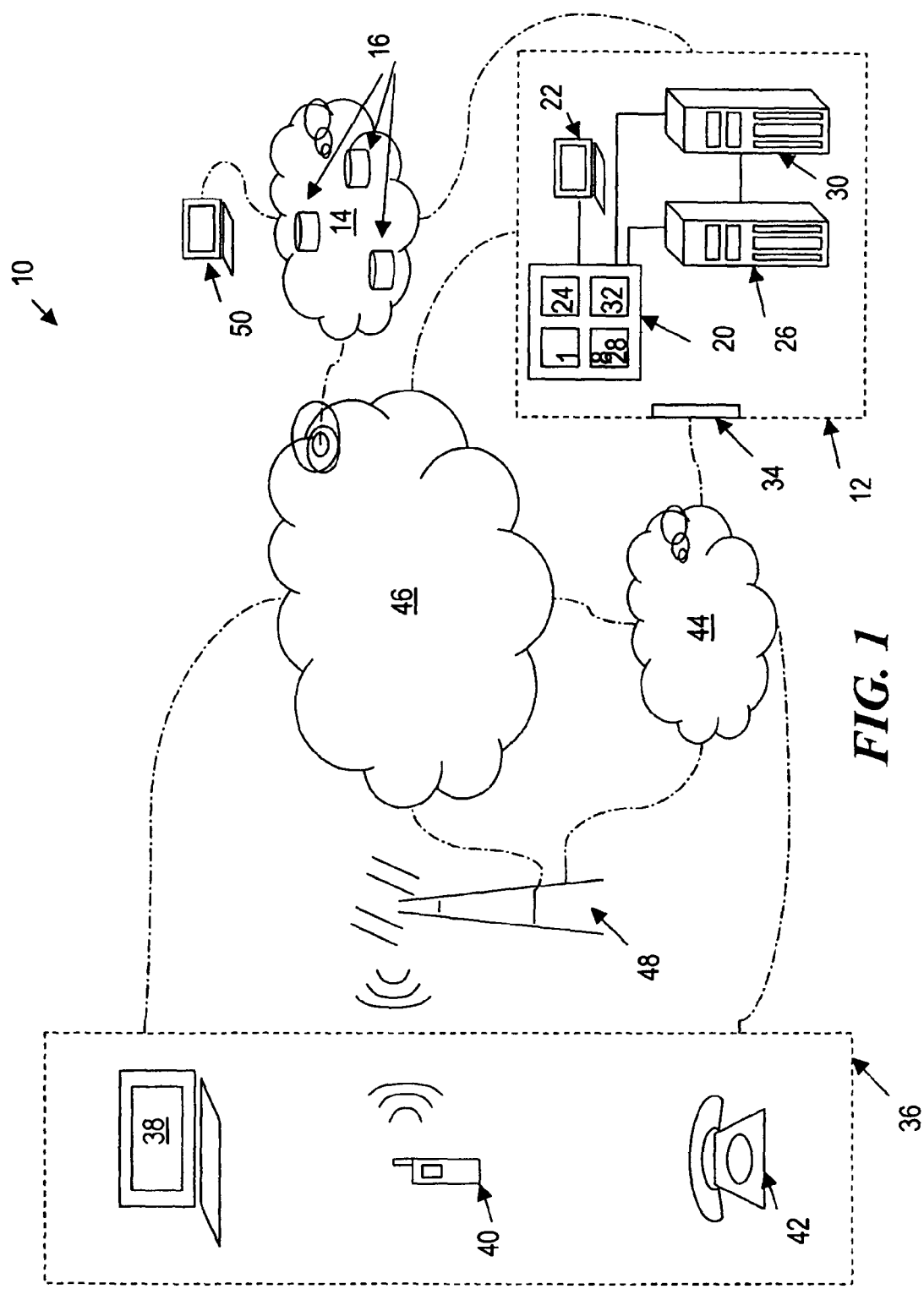
FIG. 1 shows a block diagram of a multi-modal network monitoring system incorporating teachings of the present disclosure.

As mentioned above in the brief description of the drawings, FIG. 1 shows a block diagram of a multi-modal network monitoring system 10 incorporating teachings of the present disclosure. System 10 includes a network operations center 12 that contains several different components. NOC 12, like other network operations center, may tend to rely heavily on manual command line interface interaction and/or software tools that use Simple Network Monitoring Protocol (SNMP) to manage a monitored network 14 and its monitored devices 16, which may include hardware, software, firmware, or combinations thereof.

For many administrators, SNMP represents a standard way of determining if devices on a network like monitored devices 16 are operating properly. With SNMP, monitored devices 16 may effectively monitor their own activity using built-in software programs sometimes referred to as agent software. Monitored devices 16 may store information about their own activity in a local data store or database called a management information base (MIB). The information stored in a typical MIB may be protocol data units (PDUs). An overall network management engine 18, like IBM's NetView, may be running as an application or engine on a NOC server 20 and may be capable of initiating a query to various agents on network 14 and effectively "ask" for a copy of their respective MIB information.

A managed network system incorporating teachings of the present disclosure may contain at least two primary elements: network management engine 18 and agent software running on monitored devices 16. Network management engine 18 may reside at and be executing on a server, workstation or console, like NOC server 20. Network management engine 18 may allow a network administrator to perform network management functions and initiate management commands like get, get next, get bulk, inform, and set from a management console 22. As mentioned above, device agents may be entities that interface to monitored devices 16, and the device agents may initiate among other things response signals and/or event notifications or traps.

Bridges, Hubs, Routers and/or network servers may be examples of monitored devices 16. However, monitored devices 16 may also include objects. For example, a network server may contain physical objects, hardware, configuration parameters, and/or operational statistics. Each of these objects may act as one or more of monitored devices 16, as each of these objects may have an impact on the then-current operation of their parent device and network 14.

In practice, SNMP may be less of a "protocol" and more of a client server application that runs on the User Datagram Protocol UDP service of the TCP/IP protocol suite. Moreover, SNMP may not be the only option for network management "protocols". Common Management Information Protocol (CMIP) provides a powerful and secure alternative to SNMP. However, CMIP tends to have more overhead than SNMP, which may not be extremely efficient anyway. In operation, SNMP uses considerable bandwidth relaying extra information like the version number, which is often included in every message.

Whatever the basis of the deployed network management system, the tools used are often very powerful and productive but tend to limit visual access to relevant network information to graphical user interfaces (GUIs) or command line format displays. And, accessing this information usually requires a NOC-centric computer with an attached display device and a network connection like management console 22.

In the embodiment depicted in FIG. 1, system 10 and NOC 12 may improve upon conventional techniques for accessing relevant network information. For example, NOC 12 may make network information and management functions available in different modalities by incorporating such things as a text-to-speech engine, an Interactive Voice Response (IVR) system, a speech-enabled interface architecture, or some GUI-less interface.

As depicted in FIG. 1, NOC 12 may allow multiple modes of interaction, either individually or together. These modes and their implementation may include, among other things, GUIs, speech interaction, visual interaction, pen or stylus interaction, gestures-based interaction, quasi-virtual reality interaction or some other Haptics-based interaction. As such, NOC 12 may facilitate various modalities of human to computer interaction and make it easier to connect and share network information between multiple devices and multiple people.

In some embodiments, a system incorporating teachings of the present disclosure may be able to adapt information exchange to a given device, to a user preference, and/or network state or other condition. For example, an access device engine 24 may be capable of determining an access device type used by a calling or accessing party to interact with the network management engine 18. In some embodiments, access device engine 24 may include a format converter that can translate at least a portion of available network information into a signal and/or signal type receivable by a given access device type. There may be several mark-up languages and techniques employed in system 10 to facilitate this and other capabilities. For example, a designer of system 10 and NOC 12 may elect to use XHTML, SMIL or some other mark-up language in conjunction with a speech recognition engine. Other designers may elect to use VoiceXML, HTML, Voice Browser, Xforms, and/or others.

In preferred embodiments, a system administrator may be able to call into a caller response unit like IVR system 26 to troubleshoot networks on a proactive or reactive measure. The system administrator may go through IVR 26 to ask specific questions about the network, to instruct the network components to execute troubleshooting commands such as "pings", "traceroutes", etc., or to perform other network management and maintenance functions like network troubleshooting, performance monitoring, third party network coordination, software maintenance and distribution, as well as router and domain name management.

As mentioned above, network management engine 18 may be capable of issuing a request to monitored devices 16 and further capable of receiving network information in response to the request. In some embodiments, a multi-modal administration engine 28 may allow a calling party or administrator to interact with network management engine 18. A caller response unit (like IVR 26) associated with multi-modal administration engine 28 may be capable of receiving a user input from the administrator and converting the user input into a request for network information.

In preferred embodiments, a format converter, which may be a stand alone engine or component like text-to-speech translator 30 or an asset incorporated into another engine like access device engine 24, may be associated with multi-modal administration engine 28 and capable of translating at least a portion of a first signal representing network information into a second signal representing an audible sound. The audible sound may be played to the administrator so that the administrator may receive network information in a modality other than or in addition to the graphical presentation of text.

A system administrator working with a NOC, like NOC 12, that incorporates teachings of the present disclosure may be able to work remotely without a networked data connection to the NOC. The administrator may be able, during times of a NOC failure, to provide a backup solution for monitoring networks. Embodiments incorporating teachings contained herein will preferably provide increased flexibility to network administrators and be operational with products that may or may not be SNMP manageable. Embodiments may be employed with voice networks, data networks, other communications networks, or combinations thereof.

In light of the potential authority granted to a remotely located administrator, a system incorporating teachings of the present disclosure may elect to use some rights management technique. For example, a system like system 10 may employ a security engine 32, which could include an authentication engine and an authorization engine. In practice, the authentication engine may be communicatively coupled to a caller response unit like IVR 26. The authentication engine may be able to compare an initial set of credentials received from the calling party against a maintained set of credentials. The credentials may include, for example, a user name and password combination. If the received credentials match the maintained credentials, the authorization engine may grant access to multi-modal administration engine 28.

As mentioned above, an administrator may call NOC 12 and/or be called by NOC 12. As such, a system incorporating the present teachings may include a telephone interface 34 capable of connecting an administrator's call to a component of system 10 like IVR 26. In some embodiments, interface 34 may be capable of receiving a voice over internet protocol (VoIP) call, a wireless call, and/or a more traditional Plain Old Telephone Service (POTS) call. The call may be a voice call, a data call, or a combination thereof.

In the embodiment of FIG. 1, system 10 may be capable or receiving and/or initiating calls through interface 34. System 10 may also be capable of routing network information back to an administrator and/or the administrator's access device or devices. System 10 could, for example, include a modality engine that initiates the routing of audible information or speech signals to a first access device like a telephone and the routing of additional network information like graphical or visual presentations of information to a second access device like a computer, laptop, personal digital assistant (PDA), smart telephone, or other device capable of receiving data.

As mentioned above, the access device type may effect how network information is communicated to a remote administrator. Similarly, the connection or link type may impact delivery of network information. For example, an administrator may elect to access multi-modal administration engine 28 with one or more remote access devices 36, which may include a computer 38, a wireless telephone 40, and a wireline telephone 42. Accessing with wireline telephone 42 may involve calling NOC 12 across Public Switched Telephone Network 44. Accessing with computer 38 may involve connecting to NOC 12 across a portion of Public Switched Telephone Network 44 and/or a larger network like Internet 46. A connection between computer 38 and NOC 12 may involve the communication of a TCP/IP packet and may be pure data communication or a combination data and voice communication. The voice portion of the combination may involve the creation of a derived voice channel, a VoIP call, an instant messenger (IM) connection, some other technique, or a combination thereof.

Accessing with wireless telephone 40 may involve connecting to NOC 12 via a wireless network component 48, a portion of Public Switched Telephone Network 44 and/or a larger network like Internet 46. A wireless link type may depend on the electronic components associated with a given wireless access device and other wireless networking components like cellular towers or wireless local area network (LAN) hubs.

The wireless access device, cellular tower and/or wireless hub (Wireless Enabled Devices) may include any of several different components. For example, a Wireless Enabled Device may have a wireless wide area transceiver, which may be part of a multi-device platform for communicating data using radio frequency (RF) technology across a large geographic area. This platform may be a GPRS, EDGE, or 3 GSM platform, for example, and may include multiple integrated circuit (IC) devices or a single IC device.

A Wireless Enabled Device may also have a wireless local area transceiver, which may communicate using spread-spectrum radio waves in a 2.4 GHz range, 5 GHz range, or other suitable range. The wireless local area transceiver may be part of a multi-device or single device platform and may facilitate communication of data using low-power RF technology across a small geographic area. For example, if the wireless local area transceiver includes a Bluetooth transceiver, the transceiver may have a communication range with an approximate radius of one hundred feet. If the wireless local area transceiver includes an 802.11(x) transceiver, such as an 802.11(a)(b) or (g), the transceiver may have a communication range with an approximate radius of one thousand feet.

In addition to the use of remote access devices, and administrator may choose to more directly access the management tools of NOC 12 from management console 22. In some embodiments, the administrator may access the tools and network information from within monitored network 14. For example, an administrator may be able to access NOC 12 from computer 50, which may be included within monitored network 14.

In practice, the information communicated across the various links of FIG. 1 may be compressed and/or encrypted prior to communication. The communication may be via a circuit-switched network like most wireline telephony networks, a frame-based network like Fibre Channel, or a packet-switched network that may communicate using TCP/IP packets like Internet. The physical medium making up at least a portion of the links may be coaxial cable, fiber, twisted pair, an air interface, other, or combination thereof. In some embodiments, at least one of the links may be a broadband connection facilitated by an xDSL modem, a cable modem, another 802.11x device, some other broadband wireless linking device, or combination thereof.

Figure 2:
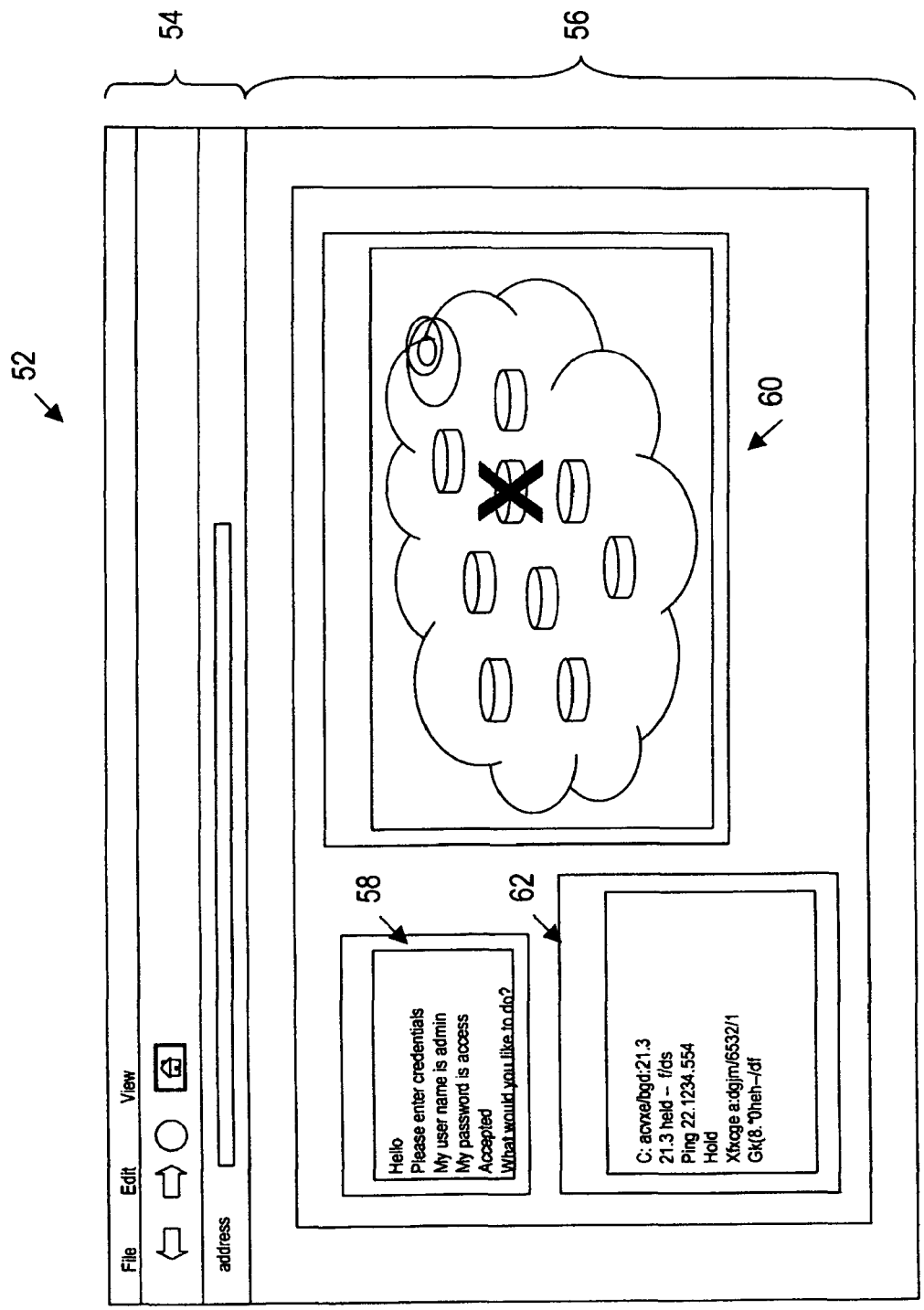
FIG. 2 depicts a representative graphical user interface that may be used when practicing a multi-modal monitoring method that incorporates teachings of the present disclosure.

In some embodiments, various pieces of information including network information may be communication to an administrator in a format that allows a graphical user interface to display textual information and a visual representation of the monitored network. As mentioned above, FIG. 2 depicts a representative graphical user interface 52 that may be used when practicing a multi-modal monitoring method that incorporates teachings of the present disclosure. GUI 52 may be presented within a display associated with an access device. GUI 52 may include a browser bar portion 54 and a display portion 56. Display portion 56 may contain several active windows 58, 60, and 62.

As depicted, window 58 may be associated with an IM client and capable of showing a transcript of the verbal communication occurring between the administrator and a NOC component. Window 58 may also be associated with a VoIP call, a derived voice channel call, a POTS call, or some other verbal communication link. Window 60 may present an image representing a monitored network, like network 14 of FIG. 1. As shown, the monitored network may be experiencing an outage—represented by an "X". Window 62 may be displaying requests issued by a network management engine, like network management engine 18 of FIG. 1.

In operation of a system incorporating teachings of the present disclosure, a voice call may be communicatively coupled to a network management engine. The network management engine and/or another engine associated with the system may receive a spoken directive from a party to the call, which may be an administrator. The spoken directive may be converted into a request for network information.

In preferred embodiments, an SNMP request representing the spoken directive may be sent from a network management engine to a monitored network device. The system may receive a response from the monitored network device, recognize that the administrator can receive audible information via the call and graphical information via a data connection. As such, the system may convert a first portion of the response to audible information and a second portion of the response to graphical information. The first portion may then be routed to the administrator via the call, while the second portion is routed to the administrator via the data connection.

Many of the above techniques may be provided by a computing device executing one or more software applications or engines. The software may be executing on a single computing platform or more than one. The platforms may be highly capable workstations, personal computers, microprocessors, servers, or other devices capable of performing the techniques. The device or devices may have a computer-readable medium having computer-readable data to receive a spoken directive from a party to a call, to convert the spoken directive into a request for information from a monitored network device, to receive a response from a software agent associated with the monitored network device, to convert the response into a spoken response, and to initiate playing of the spoken response to the party.

It will be apparent to those skilled in the art that the disclosed embodiments may be modified in numerous ways and may assume many embodiments other than the particular forms specifically set out and described herein.

Accordingly, the above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-readable medium comprising instructions that are executable by a processor to:

determine that a called party can receive audible information via a first access device and graphical information via a second access device;

initiate a call to the called party;

convert a request communicated by the called party via the first access device to a directive for a network management engine to retrieve network management information related to at least one monitored network device; and translate a first portion of the network management information to a first format for communication to the first access device and translating a second portion of the network management information to a second format for communication to the second access device.

2. The computer-readable medium of claim 1, further comprising instructions that are executable by the processor to communicate with the called party via a voice over internet protocol (VoIP) interface.

3. The computer-readable medium of claim 1, further comprising instructions that are executable by the processor to receive an input from the called party directing the network management engine to issue a query to a particular monitored network device agent.

4. The computer-readable medium of claim 1, further comprising instructions that are executable by the processor to receive an input from the called party directing the network management engine to issue a simple network management protocol (SNMP) request.

5. The computer-readable medium of claim 1, further comprising instructions that are executable by the processor to route the first portion of the network management information to the first access device and to route the second portion of the network management information to the second access device.

6. The computer-readable medium of claim 5, further comprising instructions that are executable by the processor to convert the first portion of the network management information to audible information and the second portion of the network management information to graphical information.

7. The computer-readable medium of claim 6, wherein the graphical information includes a visual representation of a network monitored by the network management engine.

8. The computer-readable medium of claim 1, further comprising instructions that are executable by the processor to decouple the call from the network management engine and to receive an additional directive originating from an input device coupled to a computing platform comprising the network management engine.

9. A network monitoring system, comprising a network management engine adapted to initiate a call to a called party, adapted to instruct at least one monitored network device to execute a network management command to test one or more network devices in response to the network management engine receiving data via a voice communication interface indicating a request from the called party for the at least one monitored network device to execute the network management command to test the one or more network devices, adapted to query the at least one monitored network device for network management information, and adapted to provide access to the network management information via a plurality of access interfaces.

10. The network monitoring system of claim 9, further comprising an access device engine adapted to identify at least one access interface used by the called party requesting the network management information and a format converter adapted to convert the network management information to a format corresponding to the at least one access interface.

11. The network monitoring system of claim 9, further comprising a modality engine adapted to receive the request from the called party via a first user access device and to route at least a first portion of the network management information from the network management engine to the first user access device and to route at least a second portion of the network management information from the network management engine to a second user access device.

12. The network monitoring system of claim 11, wherein the modality engine is adapted to route the first portion of the network management information to a voice communication device and to route the second portion of the network management information to a computing device.

13. The network monitoring system of claim 11, wherein the second portion of the network management information is provided as a graphical user interface that displays a visual representation of a network monitored by the network management engine.

14. The network monitoring system of claim 9, wherein the plurality of access interfaces includes a voice communication interface, a graphical user interface, a touch screen interface, a gesture-based interface, a quasi-virtual reality interface, a text-to-speech interface, or any combination thereof.

15. The network monitoring system of claim 9, wherein the network management information includes activity data stored in a management information base at a monitored network device.

16. The network monitoring system of claim 15, wherein the activity data stored in the management information base includes protocol data units.

17. The network monitoring system of claim 9, further comprising a security engine to verify user credentials.

18. The network monitoring system of claim 9, further comprising:

a multi-modal administration engine operable to allow a caller to interact with the network management engine; and a format converter associated with the multi-modal administration engine, the format converter operable to translate at least a portion of a first signal representing network management information into a second signal representing an audible sound.

19. The computer-readable medium of claim 1, further comprising instructions that are executable by the processor to convert a command communicated by the called party via the first access device to a directive for the network management engine to instruct the at least one monitored network device to execute the command.

20. The computer-readable medium of claim 1, wherein the at least one monitored network device is a router.

* * * * *